United States Patent

Day et al.

[15] 3,682,138
[45] Aug. 8, 1972

[54] MATING TANK FOR CRUSTACEA

[72] Inventors: John J. Day; Paul S. Hirschman, both of Fort Lauderdale, Fla.

[73] Assignee: Ocean Protein Corporation, New York, N.Y.

[22] Filed: Dec. 24, 1969

[21] Appl. No.: 887,813

[52] U.S. Cl. ................................................ 119/2
[51] Int. Cl. ........................................... A01k 61/00
[58] Field of Search .................... 119/1, 2, 3, 5, 21

[56] References Cited

UNITED STATES PATENTS

| | | | |
|---|---|---|---|
| 2,984,207 | 5/1961 | Drake | 119/2 |
| 2,804,045 | 8/1957 | Scott | 119/2 |
| 3,288,110 | 11/1966 | Goldman et al. | 119/5 |
| 3,540,414 | 11/1970 | Maloney, Jr. | 119/2 |
| 3,477,406 | 11/1969 | Fujinaga | 119/2 |
| 3,473,509 | 10/1969 | Miyamura | 119/2 |
| 2,981,228 | 4/1961 | Brandano | 119/2 |
| 3,389,687 | 6/1968 | Trussell | 119/21 |
| 3,062,183 | 11/1962 | Tate | 119/15 |
| 2,944,513 | 7/1960 | Keely | 119/3 |
| 3,291,098 | 12/1966 | Halpert | 119/5 |

*Primary Examiner*—Aldrich F. Medbery
*Attorney*—Darby & Darby

[57] ABSTRACT

A mating tank for crustaceans, especially for decapods, having several individual compartments for females, one compartment for a male which adjoins all the female compartments, and movable porous dividing apparatus between male and female compartments for allowing the male to associate with a selected female. Light producing means encourage the females to moult. A method for effecting efficient mating.

8 Claims, 3 Drawing Figures

PATENTED AUG 8 1972 3,682,138
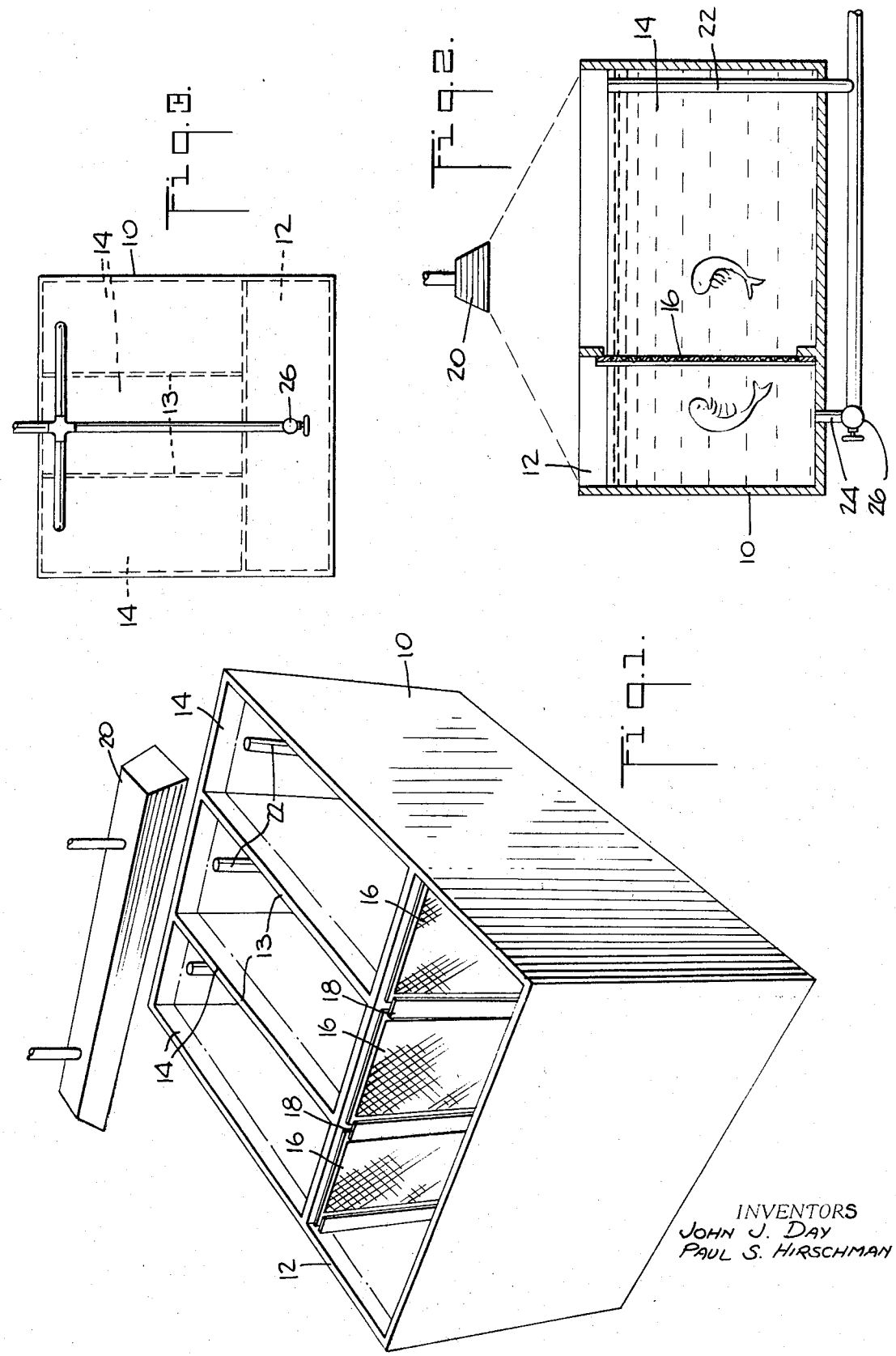
INVENTORS
JOHN J. DAY
PAUL S. HIRSCHMAN

MATING TANK FOR CRUSTACEA

BACKGROUND OF THE INVENTION

1. Field of the Invention

This invention relates to the field of the husbandry of crustacea, especially to the husbandry of shrimp.

2. Description of the Prior Art

The art in the area of husbandry of crustacea is generally primitive. Conventional fishing techniques such as fishing trawlers pulling nets are employed for obtaining shrimp and other crustacea. Because this activity is conducted in open water, the crustacea are free to migrate, without inhibition, in and out of the fishing areas. There is little that man can do in open water to encourage or alter the reproductive and developmental processes of crustacea.

It is an object of this invention to provide an apparatus and method for facilitating the efficient mating of crustacea.

More recently, it has become increasingly frequent to engage in husbandry of crustacea through the use of small closed bodies of water, such as ponds. The advantage of this type of husbandry are that a reasonably accurate count can be kept of the crustacea present in the facility, and, of course, the crustaceans can be raised and contained in a closed community and "harvested" as degree of success allows.

Although the method of raising shrimp or other crustacea in ponds is a meaningful step toward systematic and efficient husbandry, many difficulties exist in this method.

Shrimp, as well as other crustacea, are covered with a protective exoskeleton. This exoskeleton is not expandable, and for that reason, as the animal grows it must periodically break through and discard its old shell, and expand and harden the new one. This moulting phenomenon necessitates that the animal, for a short time, up to a few days, must exist without the protection of a hard exoskeleton. During this period, the crustacean is exceedingly defenseless. This is due to its lack of protection, and to the fact that it is very weak and delicate. Even gentle handling can detach an appendage and may kill the animal.

A female caridean shrimp, for example, carries her eggs in her thorax until the time at which she begins to moult. After she sheds her shell, the eggs pass to the exterior of her body. The male provides sperm cells for fertilization by depositing a gelatinous mass of these cells on the female's body. The female then extrudes the eggs through the sperms, effecting fertilization. The female moves the fertilized eggs down her body, where they become attached to special appendages on her tail.

The eggs are capable of fertilization only at the time they are extruded, which extrusion occurs a few hours after the breeding moult.

Most shrimp are known to have strong cannibalistic tendencies. If allowed the opportunity, they will devour members of their own species.

A significant feature of this reproductive activity is that it is only when the female is in the exceedingly defenseless state of having no hard shell that she is capable of mating. The female herself compounds the normally present danger of being devoured by her own kind during this fertile period, because she instinctively makes herself extremely visible and available to other shrimp at this time.

It is a further object of this invention to provide an apparatus and method whereby crustacea can be allowed the close physical association required for mating, while preventing the creatures from cannibalizing one another.

It is believed that the female shrimp emits a sexual attractant chemical substance during her fertile period which also induces the male to protect her. The effects of this chemical, however, last for only a short time.

It is another object of this invention to provide an apparatus and method whereby access of crustacea to one another can be controlled, while allowing the effects of the female's sexual attractant to affect the male before access is allowed.

When large numbers of shrimp of both sexes are indiscriminately placed together in a pond, many of the fertile, or "gravid" females, instead of successfully reproducing young, are devoured by other shrimp. Needless to say, this can cut seriously into the production of offspring. Therefore, the husbandry of shrimp in ponds does not allow the optimum production of eggs.

In the pond husbandry applications, the female's chemical sexual attractant is sufficient to protect her during at least part of her fertile period from the cannibalistic attacks of male shrimp. However, it has no effect on female shrimp, who may therefore devour her, unless the mating male actively protects her. Also, the fact that the effects of the chemical sexual attractant of the female wear off after a limited period means that even after fertilization, many of her eggs may be lost due to trauma of an attack by another shrimp. It is to be remembered that the eggs of caridean shrimp shortly after fertilization, are carried exposed on the exterior of the female's body.

SUMMARY OF THE INVENTION

This invention relates to a method and apparatus for husbandry of crustacea. It involves segregating several female shrimp into individual compartments, and one male into an adjoining compartment. Provision is made to selectively allow access between the male's compartment and a chosen one of the individual female compartments. Mating can then take place, without the danger of the defenseless female being devoured by other shrimp, and in generally quiet surroundings, thus avoiding the loss of fertilized eggs.

DESCRIPTION OF DRAWING

FIG. 1 is a perspective drawing of the crustacea mating tank.

FIG. 2 is a side view of the mating tank, showing overflow and drain facilities.

FIG. 3 is a bottom view of the mating tank, showing overflow and drain pipe facilities.

DESCRIPTION OF THE INVENTION

The mating tank consists of a main tank body 10 which is large enough to accommodate individual compartments, each individual compartment being suitable for one crustacean or shrimp to inhabit. Main tank 10 is divided by walls 13 to form individual compartments 14 for females Tank 10 is approximately 3 feet square and 2 feet deep.

Each female compartment 14 has an adjoining boundary with male compartment 12, which compartment 12 is suitable for habitation by a male crustacean.

The boundaries dividing the male from the female compartments are made of porous materials such as screens 16. Screens 16 allow the water present in any compartment to circulate freely into all of the others.

Screens 16 are provided with slides 18, which enable screens 16 to be removed from between male compartment 12 and any one of the female compartments 14. Instead of a slide arrangement, screens 16 could be hinged in the same manner as a door.

The mating tank can be provided with a suitable system of standpipes 22 and drain pipe 24, operating in conjunction with valve 26, to maintain a suitable level of water in the tank.

Light source 20 is positioned in the region above the mating tank. The function of this element is discussed below.

To apply the apparatus and method to the activity of inducing crustacea to efficiently reproduce, one female shrimp is placed in each female compartment 14, and a male in compartment 12. Successful tests have been conducted with shrimp of the species *Macrobrachium carcinus*.

The ratio of the number of female compartments to male compartments may vary, with a ratio of between 3:1 and 5:1 being found suitable.

The females are observed three times daily, and when one female is observed as having moulted her shell (noted by the presence of the empty shell) indicating that she is possibly in the fertile state, the particular barrier between her individual compartment and male compartment 12 is raised, opened, or removed entirely.

As has been noted above, the water in the mating tank is free to circulate among all the various compartments. The reason for this is to allow the female's chemical sexual attractant to permeate not only female compartment 14, but male compartment 12 as well. This feature enables the female's defensive chemical to favorably affect, or "prime," the male for reproduction before the barrier between the two compartments is removed.

It is thus evident that, when the female achieves her fertile state, she and her associate male in compartment 12 are allowed to meet. The male usually enters the female compartment and seeks her, though the female is free to move as well. This is superior to either transferring the male from a separate tank into a tank with the female, or, conversely, transferring the female from a separate tank into a tank with the male.

If the male is suddenly forced into the female's compartment, fertilization may fail to take place, due to the fact that the male has an instinct to explore thoroughly any new environment in which he is suddenly placed. The time for his exploration may divert his attention from the female for a period which allows the optimum fertile state to pass without fertilization. Also, if the male compartment does not share the same water as the female's, the female's chemical sexual attractant may not affect the male sufficiently, with disastrous consequences.

If the female is moved by extraneous forces from female compartment 14 to male compartment 12, she may become extremely disturbed and nervous, due to the trauma of being moved during her defenseless state, and may fail to respond properly to the male's advances. Worse, she may be killed, due to accidental physical damage to her soft body.

Additionally, even if fertilization should take place, the female's excessive anxiety at having been moved or transferred may cause her to become agitated and to dislodge or strip a number of the fertilized eggs from her body. This will obviously reduce the number of offspring produced.

When the barrier between the compartments is removed, the female will seek to attract the attention of the male. When she is successful, the male will deposit the sperm mass on her thorax to fertilize the eggs. The female is in little danger of being devoured or cannibalized at this point. The male is inhibited from doing so by the female's chemical sexual attractant.

Since there are no other shrimp with access to her, she is in no additional danger, as she would be in the case of reproduction in ponds.

The breeding atmosphere available in this tank has the added advantage of contributing to the female's lack of anxiety during this period which is so critical for the fertilized eggs.

The male is removed to his own compartment about 24 hours after mating. In about 3 or 4 days, the shell of the female will have hardened sufficiently to serve as some protection for her. At this point, the female may be removed to another facility in which hatching of the eggs will take place. A new female may replace her in her former home, one of the female compartments 14.

Light source 20 serves as a means to encourage frequent moulting by the shrimp and maturing of the ovaries and thus to provoke more frequent fertile states among the various females. It is known that long term exposure to light will induce more frequent moulting than if the shrimp are left in darkness.

It is evident that this invention provides a significant advance in the husbandry, particularly the efficient mating, of crustaceans such as caridean shrimp.

What is claimed is:

1. The method of encouraging the mating of a male crustacean with a selected female of the same species, comprising the steps of:
   a. isolating at least one female in an individual female compartment,
   b. isolating said male in a male compartment,
   c. providing a common water environment between said male and female compartment to permit the sexual attractant given off by a female to reach the male, and
   d. selectively permitting access between said female compartment and said male compartment when the female becomes fertile.

2. The method of claim 1 wherein step (a) includes the step of isolating a plurality of females each one being in a separate compartment; step (c) includes providing said common water environment between each compartment isolating a female therein and the compartment isolating the male; and step (d) includes the step of providing access between only one of said female compartments and the male compartment.

3. The method of claim 1, in which said female compartment is connected to said male compartment by a passage negotiable by said crustaceans, and in which said step of selectively permitting access comprises the removal of a porous barrier from said passage.

4. The method of claim 1, comprising the further step of:

providing for continuous circulation of the common water environment between said male compartment and said female compartment.

5. The method of claim 1, comprising the further step of:

illuminating said female compartment to provoke frequent fertile periods in said females.

6. The method of claim 3, comprising the further step of:

providing for continuous circulation of a common water environment between said male compartment and said female compartment.

7. The method of claim 3 comprising the further step of:

illuminating said female compartment to provoke frequent fertile periods in said females.

8. The method of claim 4, comprising the further step of:

illuminating said female compartment to provoke frequent fertile periods in said females.

* * * * *